(No Model.)

B. F. LAMB.
EYE SHIELD OR GUARD.

No. 540,746. Patented June 11, 1895.

WITNESSES:

INVENTOR:
Benjamin F. Lamb,
PER C. A. Shawtles
ATTYS.

THE NORRIS PETERS CO., PHOTO-LITHO., WASHINGTON, D. C.

UNITED STATES PATENT OFFICE.

BENJAMIN F. LAMB, OF BOSTON, MASSACHUSETTS.

EYE SHIELD OR GUARD.

SPECIFICATION forming part of Letters Patent No. 540,746, dated June 11, 1895.

Application filed September 25, 1891. Serial No. 406,830. (No model.)

*To all whom it may concern:*

Be it known that I, BENJAMIN F. LAMB, of Boston, in the county of Suffolk, State of Massachusetts, have invented certain new and useful Improvements in Eye Shields or Guards, of which the following is a description sufficiently full, clear, and exact to enable any person skilled in the art or science to which said invention appertains to make and use the same, reference being had to the accompanying drawings, forming part of this specification, in which—

Figure 1:
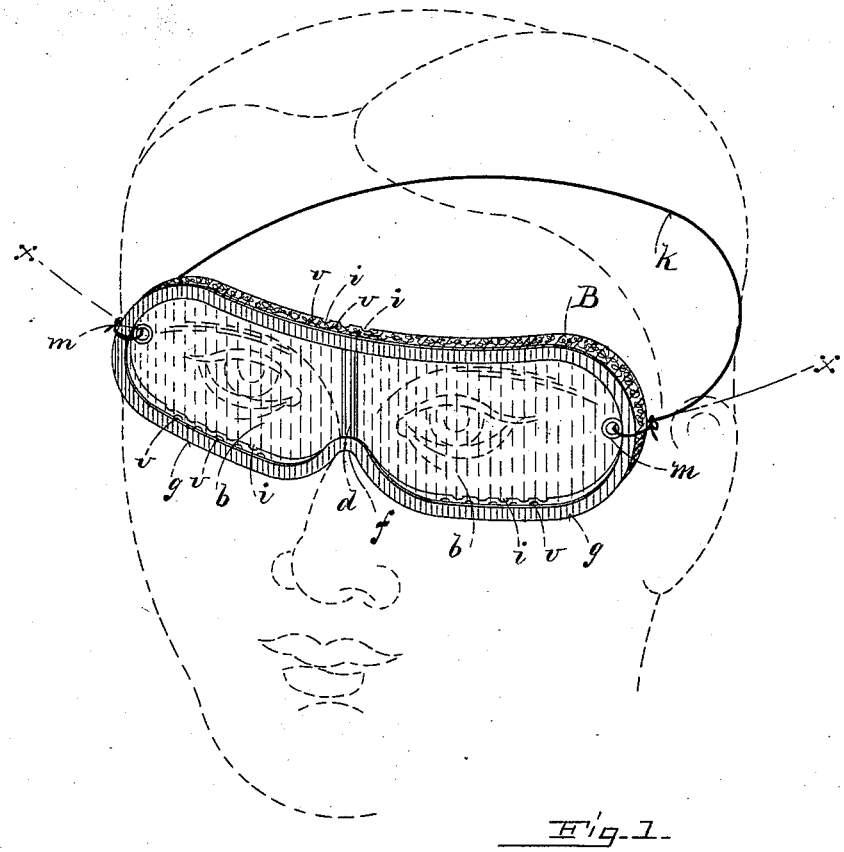
Figure 2:
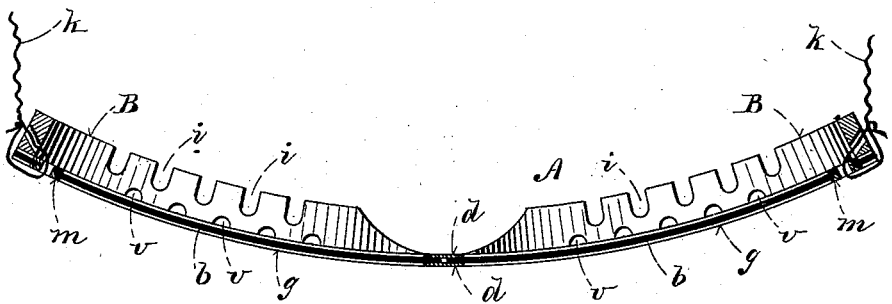

Figure 1 is a perspective view showing my improved eye-shield; and Fig. 2, a horizontal longitudinal section of the same, taken on line *x x* in Fig. 1.

Like letters of reference indicate corresponding parts in both figures of the drawings.

My invention relates especially to a flexible non-heat conducting eye-shield which is particularly adapted for use as protection from the weather and by mechanics in various occupations as a guard against sparks, dust or other flying substance; and is designed as an improvement on the device shown in my United States Letters Patent numbered 450,515, dated April 14, 1891.

In the drawings, A represents the shield considered as a whole.

The shield consists preferably of two lenses, *b*, constructed of mica or other similar flexible transparent material. These lenses are sufficient in length and breadth to completely cover or overlap the orbital openings of the face, the flexibility of the material being alone depended upon for conformity of the device to the face. The lenses, *b*, are secured centrally by vertical strips of cloth or similar material, *d*, cemented thereto and forming a hinge therefor, although said lenses may be formed integral if desired; or any suitable means other than that specified may be employed for hinging said lenses. At *f*, the lenses are cut away vertically at their lower edge to form an opening for the nose. On the edges, the lenses are bound with a thin, flexible material, *g*, and on the inner face around said edge a cushion, B, composed of felt, or other light flexible material is secured by any suitable means. This cushion is of sufficient depth to hold the lenses a suitable distance from the face. Through the cushion centrally or at its outer edge vertical air or ventilation openings, *i*, are formed, as many of said openings being employed as may be deemed desirable. In the inner edge of the cushion and adjacent the inner faces of the lenses, ventilation openings, *v*, are formed. An elastic cord, *k*, is secured in eyelets, *m*, in the outer ends of the lenses or through the cushions, said cord being employed to secure the device to the head.

In use the shield is adjusted over the eyes, the cushion, B, bearing against the forehead and on the face around and under the eyes. The size of the lenses prevents interference with the sight in any direction, while the eyes are protected from heat by the non-conductive nature of the material forming said lenses, and from dust or snow or other flying particles.

When mica is employed, such material possessing no magnifying qualities, the sight is not thereby interfered with. Moreover, all danger from breaking the lenses as when glass is used is overcome.

The ventilation openings, *i*, *v*, prevent moisture from the face from collecting in the inner side of the lenses, and injury to the eyes from confining the air which would gradually become heated by contact with the body of the wearer.

My device is particularly applicable for use in driving as a protection against rain, snow and flying particles and in such use perfect ventilation is absolutely essential. Extreme lightness and flexibility and enlarged lenses are also essential for such uses none of which properties are possessed by devices heretofore made.

It will be understood that the size of the body or lenses may be increased to any degree for covering any portion of the face desired; and said lenses may be formed integral or without the hinge if desired, the flexible nature of the material rendering this practical.

It will be further observed that by disposing the ventilation openings, *v*, next the inner side of the lenses when they are farthest removed from the face of the wearer and more exposed to outside influences, currents of air will be induced next the inner side of said lenses rather than next the eyes of the wearer, whereby any particles of moisture induced by heat from the face will be carried off instead of adhering to the lenses. The eyes will also be less subjected to air currents than were said openings, $v$, absent. I have found from experience that the openings, $v$, contribute very markedly to the success of my improved shield. The flexible cushion is also essential as when the body or lenses are permitted to engage the face adjacent the eyes moisture more readily collects thereon. The cushion, moreover, serves to hold the lenses sufficiently far from the face to prevent discomfort to persons having thick or long eyebrows and lashes or protruding eye-balls.

Having thus explained my invention, what I claim is—

1. An eye-shield comprising lenses of flexible, transparent material, a felt strip or cushion projecting at right angles from the lenses, and provided with lateral perforations or notches, a recessed portion in said cushion for the nose, a binding strip or edging of light, flexible material for said lenses, and means for securing said shield upon the face, substantially as described.

2. As a new article of manufacture the eye-shield above described made up of two lenses of flexible transparent material, a cushion of felt, and a binding of light, flexible material connecting the cushion with the lenses, all substantially as described.

3. An eye-shield comprising lenses of flexible, transparent material, a strip or cushion of felt projecting at right angles to the lenses, a recess formed by the lower meeting edges of said strip or cushion, an edging or binding of light flexible material surrounding the peripheries of said lenses and serving as a connection between said cushion and lenses, a central transverse binding strip connecting said lenses and forming a hinge therefor, and lateral perforations or notches or both formed in said cushion and providing ventilation therethrough substantially as described.

4. An eye-shield comprising two lenses of flexible transparent material, connected by a transverse hinge, and a cushion of felt all substantially as described.

5. An eye-shield consisting of two sections transversely hinged together, each section being constructed of a light flexible rim, a transparent flexible material held by said rim, and a notched or perforated strip or binding of felt or suitable material held to said rim, substantially as described.

6. An eye shield consisting of two transparent sections transversely hinged together, a binding for each section, and a cushion of felt or other suitable material mounted upon said bindings, substantially as described.

7. An eye-shield for the purposes specified comprising a body constructed of mica or similar flexible, transparent material and formed in two hinged sections provided with means for holding it to the face, substantially as described.

8. An eye-shield comprising two transparent sections, each constructed of flexible materials, transversely hinged together, substantially as described.

9. An eye-shield consisting of two transparent sections transversely hinged together, each section being made of a flexible, transparent material, and a flexible binding for each section, substantially as described.

10. An eye-shield consisting of two sections transversely hinged together each section being constructed of a light flexible rim, a transparent flexible material held by said rim, and a strip or cushion of felt or suitable material mounted upon said rim, substantially as described.

11. An eye-shield consisting of two transparent sections having a binding of light flexible material, and a strip of felt or other suitable material held by each of said bindings.

12. An eye-shield consisting of two sections, said sections being made of flexible transparent material with their inner or contiguous edges substantially straight, and a flexible binding following the contour of said transparent sections, overlapping their curved outer edges and extending along their inner or straight edges to form a bearing for said straight edges, substantially as shown and described.

13. An eye-shield consisting of two flexible, transparent sections having a binding of light flexible material and a cushion of felt or equivalent material held by said binding, the said cushion being substantially rectangular in cross section and projecting at right angles from the back of said transparent sections at their curved outer edges, substantially as shown and described.

14. An eye-shield comprising two lenses made of flexible transparent material with their inner edges substantially straight and meeting each other at the bridge portion substantially parallel with the minor axes of the lenses, and a flexible binder holding together the said lenses, substantially as described.

15. An eye-shield having its two lenses and bridge portion made of the same flexible transparent material, the perimeter of the shield marking the boundary of said flexible, transparent lenses and bridge portion; said shield having a projection extending substantially at right angles from the back thereof to bear against the face of the wearer and hold the lenses from the eyes, and with means to hold said shield in place on the face of the wearer, substantially as described.

BENJAMIN F. LAMB.

Witnesses:
K. DURFEE,
O. M. SHAW.